(12) United States Patent
Yoon et al.

(10) Patent No.: US 9,032,333 B2
(45) Date of Patent: May 12, 2015

(54) DISPLAY APPARATUS AND DISPLAYING METHOD OF THE SAME

(75) Inventors: Yeo-ri Yoon, Suwon-si (KR); Chang-soo Lee, Seoul (KR); Sang-hee Lee, Seoul (KR); Dong-heon Lee, Seoul (KR); Joon-ho Phang, Seoul (KR); Hyeon-ji Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 12/754,958

(22) Filed: Apr. 6, 2010

(65) Prior Publication Data
US 2011/0072377 A1 Mar. 24, 2011

(30) Foreign Application Priority Data
Sep. 24, 2009 (KR) .................. 10-2009-0090424

(51) Int. Cl.
*G06F 3/048* (2013.01)
*G06F 17/30* (2006.01)
*G06F 3/00* (2006.01)
*G06F 3/0482* (2013.01)
*G06F 3/0481* (2013.01)

(52) U.S. Cl.
CPC .... *G06F 17/30274* (2013.01); *G06F 17/30864* (2013.01); *G06F 17/30867* (2013.01); *Y10S 707/99935* (2013.01); *G06F 3/0481* (2013.01); *G06F 3/0482* (2013.01); *G06F 17/30873* (2013.01)

(58) Field of Classification Search
CPC ............... G06F 17/30274; G06F 17/30864; G06F 17/30867; G06F 3/0481; G06F 17/30873
USPC ............................ 715/768, 838, 821
See application file for complete search history.

(56) References Cited

U.S. PATENT DOCUMENTS

| | | | | |
|---|---|---|---|---|
| 5,434,626 | A * | 7/1995 | Hayashi et al. | 348/569 |
| 6,118,427 | A | 9/2000 | Buxton et al. | |
| 7,178,110 | B2 * | 2/2007 | Fujino | 715/838 |
| 2002/0194591 | A1 | 12/2002 | Gargi | |
| 2003/0063125 | A1 * | 4/2003 | Miyajima et al. | 345/781 |
| 2006/0218499 | A1 * | 9/2006 | Matthews et al. | 715/765 |
| 2007/0168877 | A1 * | 7/2007 | Jain et al. | 715/772 |
| 2008/0205796 | A1 * | 8/2008 | Jonsson | 382/311 |
| 2009/0103899 | A1 | 4/2009 | Lessing | |

(Continued)

FOREIGN PATENT DOCUMENTS

| | | |
|---|---|---|
| JP | 2-114318 A | 4/1990 |
| JP | 5-20016 A | 1/1993 |

(Continued)

OTHER PUBLICATIONS

Kersten, Mik., Focusing knowledge work with task context, 2007, ProQuest Dissertations and Theses. vol. 0984, Iss.2500.*

(Continued)

*Primary Examiner* — Jordany Nunez
(74) *Attorney, Agent, or Firm* — Sughrue Mion, PLLC

(57) ABSTRACT

A display apparatus and a displaying method of the same, the display apparatus including a content output unit which outputs at least one content; a display unit; a video processor which processes and outputs a list image of the contents to the display unit; and a controller which controls the video processor to change a display effect of the list image according to frequency of use of the contents.

13 Claims, 7 Drawing Sheets

(56) References Cited

U.S. PATENT DOCUMENTS

| | | | |
|---|---|---|---|
| 2009/0207316 A1* | 8/2009 | Cupal et al. | 348/700 |
| 2009/0228841 A1* | 9/2009 | Hildreth | 715/863 |
| 2010/0185986 A1* | 7/2010 | Quintanilla et al. | 715/835 |

FOREIGN PATENT DOCUMENTS

| | | |
|---|---|---|
| JP | 10-333861 A | 12/1998 |
| JP | 2002-77779 A | 3/2002 |
| JP | 2004-242288 A | 8/2004 |
| JP | 2005-148798 A | 6/2005 |
| JP | 2007-293849 A | 11/2007 |

OTHER PUBLICATIONS

Benford, Steve et al., "VR-VIBE: A Virtual Environment for Co-operative Information Retrieval", Eurographics, vol. 14, No. 3, 1995, p. 349-360, XP002622743.

Extended European Search Report dated Feb. 25, 2011, in Application No. 10162042.5.

Communication dated Feb. 28, 2012 issued by the European Patent Office in European Application No. 11184205.0.

Karen D. Grant, et al: "Beyond the Shoe Box: Foundations for Flexibly Organizing Photographs on a Computer", Jan. 1, 2002. Retrieved from the Internet on Feb. 21, 2012, 10 pages, XP55019901.

Yasuhiko Yasuda, et al: "Image Database System Featuring Graceful Oblivion", IEICE Trans. Commun., vol. E79-B, No. 8, Aug. 1996, 8 pages, XP000628638.

Beverly Harrison, et al: "Squeeze Me, Hold Me, Tilt Me! An Exploration of Manipulative User Interfaces", Apr. 1, 1998, retrieved from the Internet on Feb. 21, 2012, 8 pages, XP55019902.

European Search Report, dated Nov. 5, 2010, issued in Application No. 10162042.5.

Communication dated Nov. 2, 2011 issued by the European Patent Office in counterpart European Patent Application No. 10162042.5

Communication dated Nov. 9, 2011 issued by the European Patent Office in counterpart European Patent Application No. 11184205.0

Harrison B L Ed-Katz I R et al:"Transparent Layered User Interfaces: An Evaluation of a Display Design to Enhance Focused and Divided Attention", Human Factors in Computing Systems, New York, May 7, 1995, pp. 317-324

Harrison B L et al:"An Experimental Evaluation of Transparent Menu Usage", Common Ground CHI '96 Conference Proceedings. Conference on Human Factors In Computing Systems., Apr. 13, 1996, pp. 391-398.

Communication dated Feb. 25, 2014 issued by the Japanese Patent Office in counterpart Japanese Application No. 2010-153293.

Communication dated Dec. 2, 2013 issued by the European Patent Office in counterpart European Patent Application No. 11184205.0.

\* cited by examiner

DISPLAY APPARATUS AND DISPLAYING METHOD OF THE SAME

CROSS-REFERENCE TO RELATED APPLICATION

This application claims priority from Korean Patent Application No. 10-2009-0090424, filed on Sep. 24, 2009 in the Korean Intellectual Property Office, the disclosure of which is incorporated herein by reference.

BACKGROUND OF INVENTION

1. Field of Invention

Apparatuses and methods consistent with the present invention relate to a display apparatus and a displaying method of the same, and more particularly, to a display apparatus capable of browsing contents and a displaying method of the same.

2. Description of the Related Art

A display apparatus can be provided with a list of contents for content browsing. When the list of contents is drawn up, the contents are displayed as thumbnail images or simple texts, so that a user can select desired contents in the list, thereby reproducing or executing the contents.

In general, if a user wants to classify the contents according to predetermined characteristics, the user can generate a specific folder and individually group the contents into the specific folder, or add an image such as a star icon or the like to a currently displayed list.

SUMMARY OF THE INVENTION

Accordingly, an aspect of the present invention is to provide a display apparatus capable of intuitively displaying contents according to frequency of use and a displaying method of the same.

According to an exemplary embodiment of the present invention, there is provided a display apparatus capable of intuitively displaying recently used contents and a displaying method of the same.

The foregoing and/or other aspects of the present invention can be achieved by providing a display apparatus comprising a content output unit which outputs at least one content; a display unit; a video processor which processes and outputs a list image of the contents to the display unit; and a controller which controls the video processor to change a display effect of the list image according to frequency of use of the contents.

The video processor may change video noise, hereinafter simply referred to as noise, of the list image according to frequency of use of the contents.

The video processor may change light and shade of the list image according to frequency of use of the contents.

The video processor may change transparency of the list image according to frequency of use of the contents.

The video processor applies a mosaic process to the list image of contents not selected for a predetermined period of time.

The video processor may change an inclination of the list image of latest selected contents to be different from inclination of other list images.

The list image may include at least one list images of a thumbnail image of the contents, a main scene of the contents, a title image of the contents, and a folder storing the contents.

Another aspect of the present invention can be achieved by providing a displaying method of a display apparatus including a display unit, the method including: receiving a selection signal for displaying a list image of at least one content; and processing the list image of the contents to be changed in a display effect according to frequency of use of the contents.

Yet another aspect of the present invention can be achieved by providing a computer readable recording medium having recorded thereon a program for executing the displaying method of the display apparatus.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
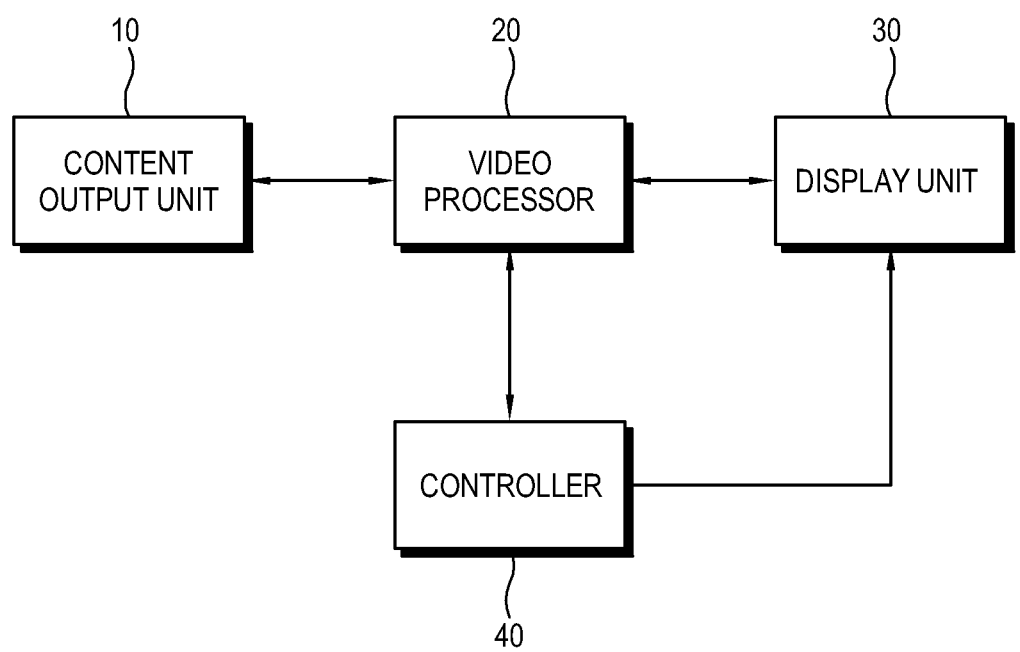
FIG. 1 is a control block diagram of a display apparatus according to an exemplary embodiment of the present invention.

Below, exemplary embodiments of the present invention will be described in detail with reference to accompanying drawings so as to be easily realized by a person having ordinary knowledge in the art. The present invention may be embodied in various forms without being limited to the embodiments set forth herein. Descriptions of well-known parts are omitted for clarity, and like reference numerals refer to like elements throughout.

FIG. 1 is a control block diagram of a display apparatus according to an exemplary embodiment of the present invention.

As shown therein, the display apparatus includes a content output unit 10, a video processor 20, a display unit 30, and a controller 40 controlling them. The display apparatus in this embodiment may include an apparatus capable of displaying a list of contents as an image so that the contents can be distinguished or searched. That is, a computer system having a display unit, a television, various mobile terminals, a digital photo frame, a camera stored with contents, a camcorder, etc. may be the display apparatus.

The content output unit 10 corresponds to an interface to output various multimedia contents. The content output unit 10 may include a content storage to provide a photograph, a moving picture, an audio file, various documents, or the like; a connector to which a content source such as a camera, an MP3 player, a compact disc (CD) player, or the like can be connected; an interface to access a network; etc. For example, the content output unit 10 may be achieved by Bluetooth, infrared communication and wired/wireless universal serial bus (USB) communication interfaces, etc. Further, an internal/external storage medium that stores a photograph, a moving picture, an audio file, various documents, etc. may be the content output unit 10.

The video processor 20 processes a list image of contents to be output from the content output unit 10 under control of the controller 40, and displays it on the display unit 30. If the contents can be output from the content output unit 10, i.e., if the contents are available, the video processor 20 provides a list of contents available to a user as an image. Also, if a user browses contents, i.e., if a user requests a search, the video processor 20 displays the list image of contents on the display unit 30. For example, if the contents are a still image, the list image contains a thumbnail image of the still image. If the contents are an audio file, the list image contains a thumbnail image of an album jacket. If the contents are a moving picture, the list image contains a main scene thereof. Also, in the case of a document or various execution files, an image related to a title of contents, i.e., an icon may be displayed as a list image. Further, a folder containing contents may be displayed as a list image, without the contents of the folder being displayed.

The display unit 30 displays the list image processed in the video processor 30. The display unit 30 may include a liquid crystal display (LCD) panel, an organic light emitting diode (OLED), or a plasma display panel (PDP), and includes a panel driver for driving the panel.

The controller 40 controls the video processor 20 to display items about contents to be displayable or executable on the display unit 30 when a content source is connected to the content output unit 10 or when a user searches contents. Also, the controller 40 controls the video processor 20 to change the list image of the contents in a display effect according to frequency of use of the contents. Whenever the contents are selected, the controller 40 counts the frequency in selection of the contents and stores it. The video processor 20 changes the display effect of the list image according to the frequency in selection. Here, various known methods may be applied to an algorithm for changing the display effect according to specific variables.

FIGS. 2 to 6 are views showing various list images according to exemplary embodiments of the present invention.

Figure 2:
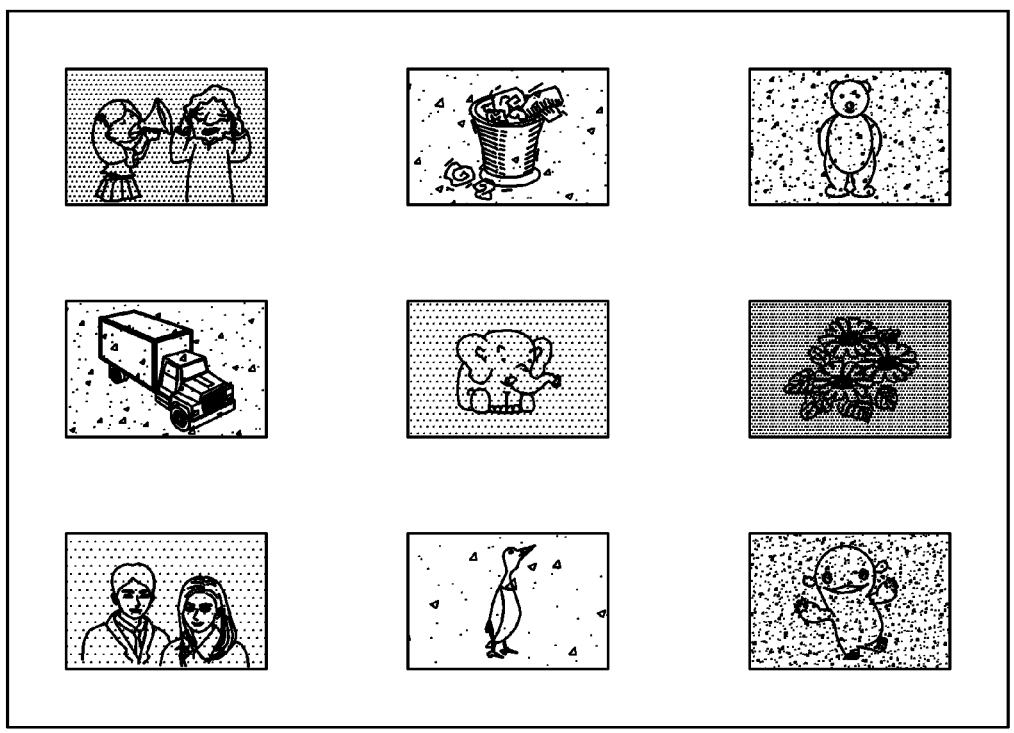
FIG. 2 shows a list image in the display apparatus of FIG. 1.

FIG. 2 shows a list image which changes using noise according to frequency of use of contents. If the frequency with which a user uses the contents, i.e., the frequency in displaying and executing the contents is high, very little noise is added to the list image so that the list image can be clearly and definitely displayed. On the other hand, if the frequency of use is low, much noise is added so that the list image can be unclearly and roughly displayed like an old photo. A user can intuitively know his/her preference of using the contents through the list image of contents, and be also reminded of the existence of the contents. Through the list image, the contents can be readily managed. For example, the contents correspond to very low frequency of use may be deleted, but the contents correspond to high frequency of use may be separately managed as a file.

Figure 3:
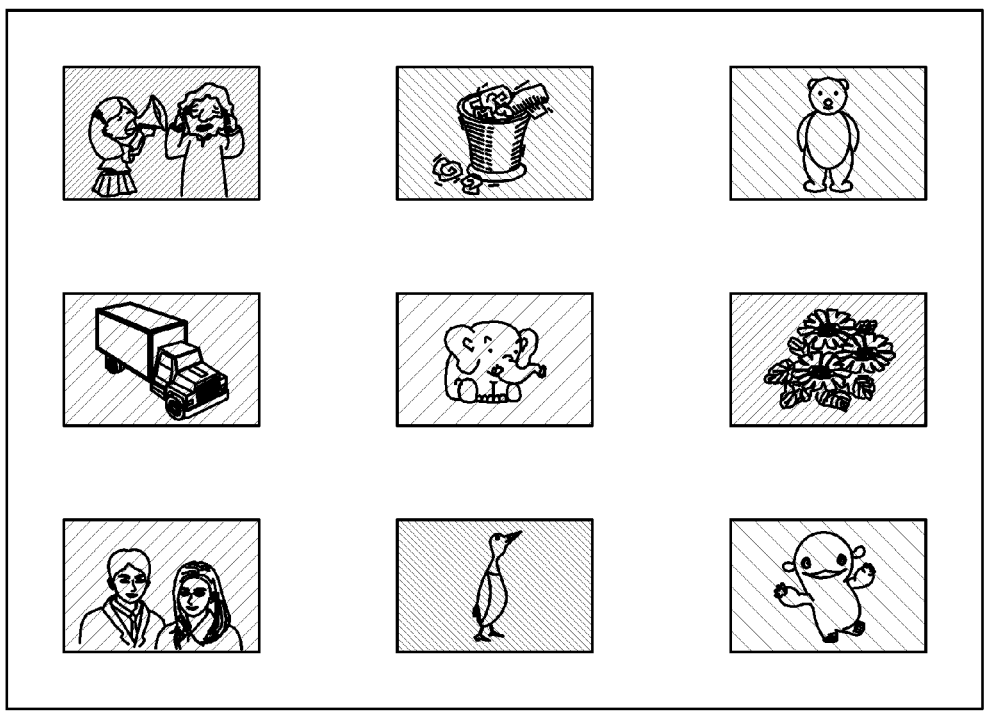
FIG. 3 shows another list image in the display apparatus of FIG. 1.

FIG. 3 shows a list image of contents that can be changed using light and shade according to frequency of use. In FIG. 3, the list image is hatched, in which a narrower interval between oblique lines represents a darker image, but a broader interval between oblique lines represents a brighter image. The controller 40 may make the list image brighter as the frequency of use becomes higher, and darker as the frequency becomes lower. That is, the display effect of the list image is not limited as long as a user can easily distinguish among the use frequencies of plural contents through the light and shade of the contents.

Alternatively, the list image may be changed using transparency or outline clearness according to frequency of use. Also, the list image may be changed in a color tone according to frequency of use. For example, if the frequency of use is low, the list image is changed to have a black or dark brown tone, thereby having an aged photo effect. As long as frequency of use of contents is distinguished at a glance and the content corresponding to high frequency is emphasized, various methods of displaying the list image can be employed.

Figure 4:
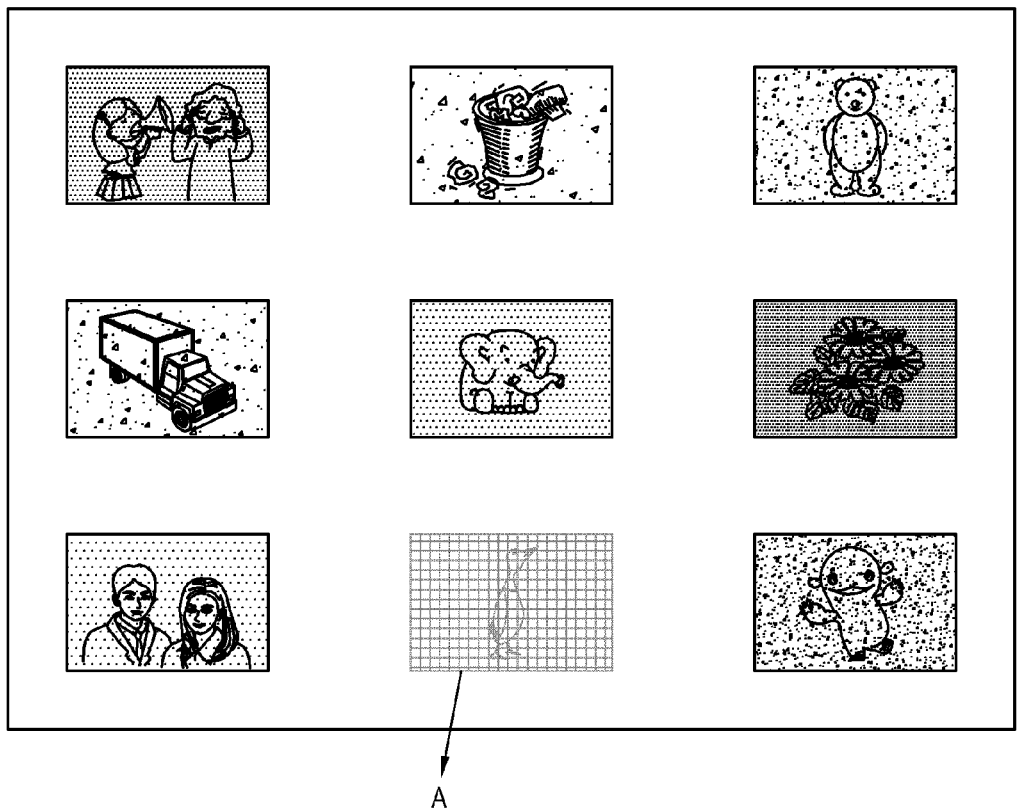
FIG. 4 shows another list image in the display apparatus of FIG. 1.

FIG. 4 shows that a list image of contents not selected for a predetermined period of time undergoes a mosaic process. In this exemplary embodiment, the video processor 20 applies the mosaic process to the contents corresponding to particular low frequency of use in addition to the display effect of the list image changed according to the frequency of use. If a list image of FIG. 4 is the list image of contents not selected by a user for a specific period of time, e.g., ten days, one month or one years, the list image A may undergo the mosaic process. Instead of the mosaic process, this list image may be inactivated, i.e., processed not to be selectable.

Differently, the list image of the contents corresponding to the high use frequency may be processed to be distinguishable from the other list image of the contents corresponding to low frequency use. For example, an animation having a left and right motion may be added to the list image. Alternatively, the list image may be repetitively zoomed in and out. Through the content search, a user can more easily recognize the frequency of use of the contents.

Figure 5:
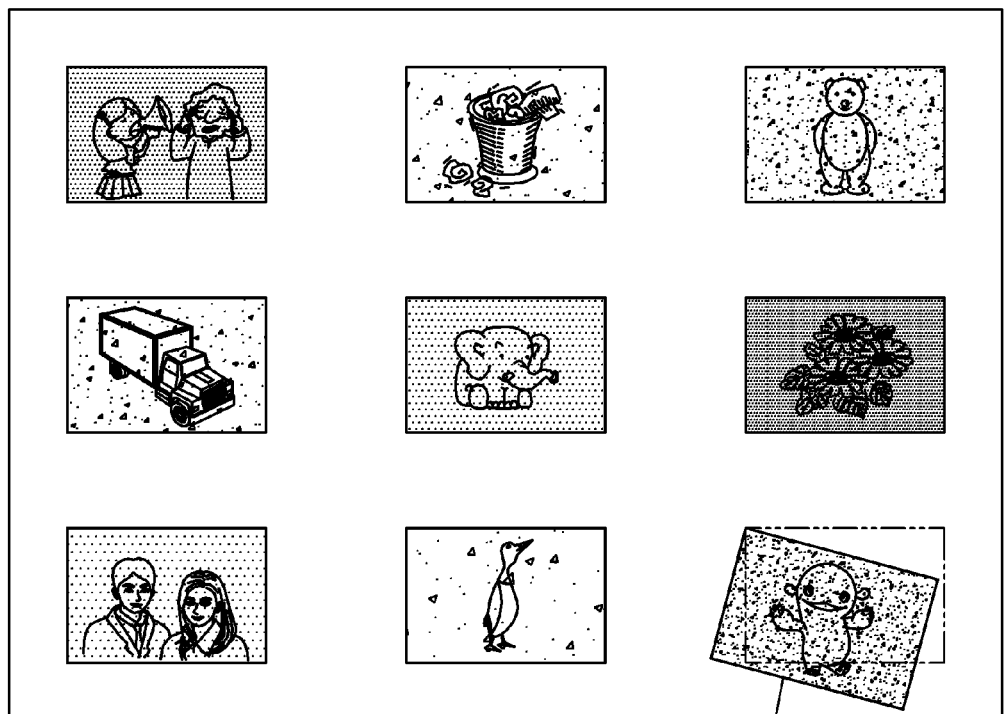
FIG. 5 shows another list image in the display apparatus of FIG. 1.

FIG. 5 shows that the image list of latest used contents is displayed differently from the other list images. The video processor 20 changes an inclination of the latest list image B such that displaying or opening the contents is indicated as being different from those of the other list images. The list image is inclined downward as if a user takes out a photo from an album and then stops. Alternatively, the list image may be inclined upward. Instead of changing the inclination, the list image of latest used contents may be changed in its outline. For example, the outline of the list image may be displayed by a bold line or the bold outline may be highlighted.

Figure 6:
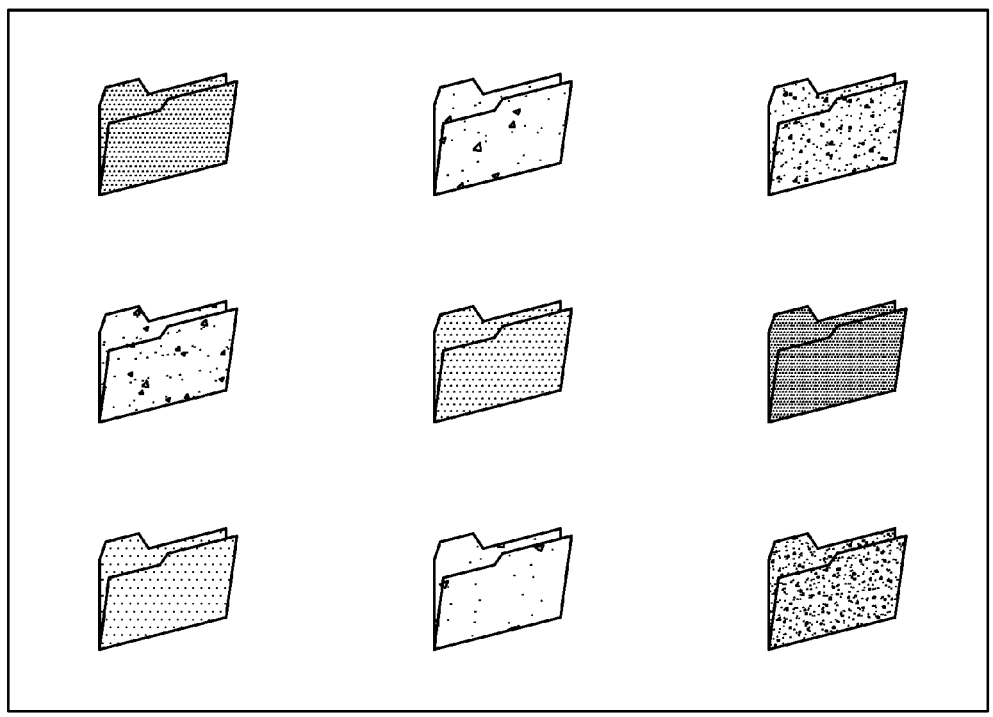
FIG. 6 shows another list image in the display apparatus of FIG. 1.

FIG. 6 shows another list image in the display apparatus of FIG. 1. In this embodiment, the list image corresponds not to the contents but a folder to which the contents belong. Thus, a user may browse not only the list image of contents but the list image of folders in which the contents are stored. In this case, the video processor 20 may change the display effect of a folder image according to frequency of use. The list image corresponding to the folders may be changed in transparency, light and shade, noise, etc. according to frequency of use. In the case where all folders have the same shape, the folder may be changed in color or size.

Alternatively, an icon displayed on the display unit 30 may be also changed in the display effect according to frequency of use. A user may intuitively ascertain the frequency of use of contents, folders and icons through an interface provided as an image. Similarly, deletion or a reminder of the contents can be based on such intuitiveness, so that the contents can be more effectively managed.

Also, the video processor 20 may arrange the list image according to the frequency of use while changing the display effect of the list image. For example, an arranged position of the list image is changed according to frequency of use, so that a user can more definitely distinguish among the contents. Further, the frequency of use may be reflected on the list image by adjusting the size of the list image.

Figure 7:
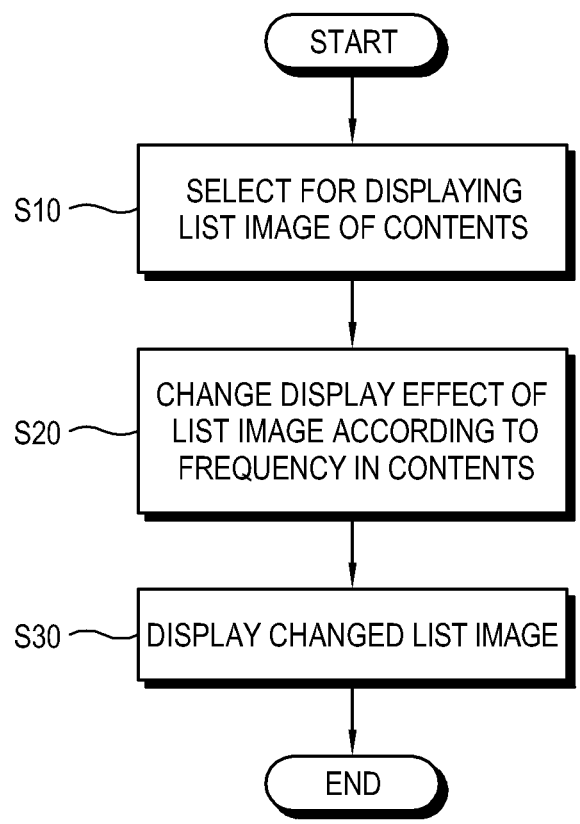
FIG. 7 is a control flowchart for explaining a displaying method of the display apparatus of FIG. 1.

FIG. 7 is a control flowchart for explaining a displaying method of the display apparatus of FIG. 1.

First, the controller 40 receives a selection signal for displaying a list image of at least one content at operation S10. Here, the selection signal may include a signal for searching contents or a signal generated when a content source is connected to the content output unit 10.

At operation S20, the controller 20 controls the video processor 20 to change the display effect of the list image according to the frequency of use of the contents. The list image may be changed in at least one of noise, light and shade, transparency, and a color tone, or may undergo the mosaic process according to frequency of use.

At operation S30, the changed list image is displayed on the display unit 30, and thus a user selects the searched list image to display or execute the contents.

As described above, according to an exemplary embodiment of the present invention, there are provided a display apparatus capable of intuitively displaying contents according to frequency of use, and a displaying method of the same.

Further, according to an exemplary embodiment of the present invention, there are provided a display apparatus capable of intuitively displaying the latest used contents, and a displaying method of the same.

Also, according to an exemplary embodiment of the present invention, there are provided a display apparatus capable of arranging contents according to frequency of use, and a displaying method of the same.

Furthermore, according to an exemplary embodiment of the present invention, there are provided a display apparatus, in which contents can be easily searched and managed, and a displaying method of the same.

Yet further, exemplary embodiments can be written as computer programs and can be implemented in general-use digital computers that execute the programs using a computer readable recording medium. Examples of the computer readable recording medium include storage media including magnetic storage media (e.g., ROM, floppy disks, hard disks, etc.) and optical recording media (e.g., CD-ROMs, or DVDs).

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising
    a content output unit which outputs at least one content;
    a display hardware unit;
    a video processor which processes and outputs at least one list image of the at least one content to the display unit; and
    a controller which controls the video processor to change a display effect of the at least one list image according to frequency of use of the at least one content,
    wherein the at least one list image of the at least one content comprises a thumbnail image corresponding to the at least one content, the thumbnail image containing an image of the at least one content if the at least one content is a still image, and the thumbnail image representing a scene of the at least one content if the at least one content is a moving picture,
    wherein the controller changes the display effect with respect to the thumbnail image according to the frequency in displaying the at least one content in the display apparatus,
    wherein the controller adds a first amount of noise to the thumbnail image of corresponding content if the frequency of use of the corresponding content is a first frequency of use, and adds a second amount of noise to the thumbnail image of the corresponding content if the frequency of use of the corresponding content is a second frequency of use, the first frequency of use being lower than the second frequency of use, and the first amount of noise being greater than the second amount of noise, and
    wherein the video processor changes a first inclination of at least one of the at least one list image, which has most recently selected contents, to be different from a second inclination of other list images.

2. The display apparatus according to claim 1, wherein the video processor changes at least one light and shade of the at least one list image according to the frequency of use of the at least one content.

3. The display apparatus according to claim 1, wherein the video processor changes transparency of the at least one list image according to frequency of use of the at least one content.

4. The display apparatus according to claim 1, wherein the video processor applies a mosaic process to the at least one list image of the at least one content not selected for a predetermined period of time.

5. The display apparatus according to claim 1, wherein the at least one list image comprises at least one of a thumbnail image of the contents, a main scene of the contents, a title image of the contents, and a folder storing the contents.

6. A displaying method of a display apparatus comprising a display unit, the method comprising:
    receiving, at the display apparatus, a selection signal for displaying at least one list image of at least one content;
    processing the at least one list image of the at least one content to be changed in a display effect according to frequency of use of the at least one content,
    wherein the at least one list image of the at least one content comprises a thumbnail image corresponding to the at least one content, the thumbnail image containing an image of the at least one content if the at least one content is a still image, and the thumbnail image representing a scene of the at least one content if the at least one content is a moving picture,
    wherein the display effect is changed with respect to the thumbnail according to the frequency in displaying the at least one content in the display apparatus,
    wherein the processing the at least one list image of the at least one content comprises adding a first amount of noise to the thumbnail image of corresponding content if the frequency of use of the corresponding content is a first frequency of use, and adding a second amount of noise to the thumbnail image of the corresponding content if the frequency of use of the corresponding content is a second frequency of use, the first frequency of use being lower than the second frequency of use, and the first amount of noise being greater than the second amount of noise, and
    wherein the processing the at least one list image of the at least one content comprises changing an inclination of at least one of the at least one list image having the most recently selected content, to be different from inclinations of other list images.

7. The method according to claim 6, wherein the processing the at least one list image of the at least one content comprises changing at least one of noise, light and shade, transparency of the at least one list image according to the frequency of use of the at least one content.

8. The method according to claim 6, wherein the processing the at least one list image of the at least one content comprises applying a mosaic process to at least one of the at least one list image of the at least one content that has not been selected for a predetermined period of time.

9. The method according to claim 6, wherein the at least one list image comprises at least one of a thumbnail image of the contents, a main scene of the contents, a title image of the contents, and a folder storing contents.

10. A non-transitory computer readable recording medium having recorded thereon a program, which, when executed by a processor, causes the processor to execute a displaying method of a display apparatus comprising a display unit, the method comprising:

receiving a selection signal for displaying at least one list image of at least one content;

processing the at least one list image of the at least one content to be changed in a display effect according to frequency of use of the at least one content, wherein the at least one list image of the at least one content comprises a thumbnail image corresponding to at least one the content, the thumbnail image containing an image of the at least one content if the at least one content is a still image, and the thumbnail image representing a scene of the at least one content if the at least one content is a moving picture, wherein the display effect is changed with respect to the thumbnail image according to the frequency in displaying the at least one content in the display apparatus, wherein the processing the at least one list image of the at least one content comprises adding a first amount of noise to the thumbnail image of corresponding content if the frequency of use of the corresponding content is a first frequency of use, and adding a second amount of noise to the thumbnail image of the corresponding content if the frequency of use of the corresponding content is a second frequency of use, the first frequency of use being lower than the second frequency of use, and the first amount of noise being greater than the second amount of noise, and wherein the processing the at least one list image of the at least one content comprises changing an inclination of at least one of the at least one list image, having the most recently selected content, to be different from inclinations of other list images.

11. The non-transitory computer readable recording medium according to claim 10, wherein the processing the at least one list image of the at least one content comprises changing at least one of noise, light and shade, transparency of the at least one list image according to the frequency of use of the at least one content.

12. The non-transitory computer readable recording medium according to claim 10, wherein the processing the at least one list image of the at least one content comprises applying a mosaic process to at least one of the at least one list image of the at least one content that has not been selected for a predetermined period of time.

13. The non-transitory computer readable recording medium according to claim 10, wherein the at least one list image comprises at least one of a thumbnail image of the contents, a main scene of the contents, a title image of the contents, and a folder storing contents.

* * * * *